(12) United States Patent
Matsuda et al.

(10) Patent No.: US 11,529,940 B2
(45) Date of Patent: Dec. 20, 2022

(54) ELECTRIC POWER CONTROL DEVICE

(71) Applicant: Kubota Corporation, Osaka (JP)

(72) Inventors: Kazuaki Matsuda, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 305 days.

(21) Appl. No.: 16/411,369

(22) Filed: May 14, 2019

(65) Prior Publication Data

US 2019/0381988 A1   Dec. 19, 2019

(30) Foreign Application Priority Data

Jun. 19, 2018  (JP) .............................. JP2018-116420

(51) Int. Cl.
*B60W 10/08*   (2006.01)
*B60L 50/16*   (2019.01)
*B60W 10/26*   (2006.01)

(52) U.S. Cl.
CPC ............. *B60W 10/08* (2013.01); *B60L 50/16* (2019.02); *B60W 10/26* (2013.01); *B60L 2200/40* (2013.01)

(58) Field of Classification Search
CPC ....... B60W 10/08; B60W 10/26; B60L 50/16; B60L 58/14; B60L 7/10; B60L 2240/421; B60L 2240/545; B60L 2240/549; B60L 58/16; B60L 50/60; B60L 2260/00; B60L 1/003; B60L 58/12; B60L 2200/40; B60L 2260/54; Y02T 10/70; Y02T 10/64; Y02T 10/72; A01D 69/02; A01D 2101/00; B60Y 2200/22

See application file for complete search history.

(56) References Cited

U.S. PATENT DOCUMENTS 6,745,117 B1  6/2004 Thacher et al.
7,956,838 B2  6/2011 Mizumaki
(Continued)

FOREIGN PATENT DOCUMENTS

EP  2623359 A1  8/2013
EP  3009286 A1  4/2016
(Continued)

*Primary Examiner* — James J Lee
*Assistant Examiner* — Steven Vu Nguyen
(74) *Attorney, Agent, or Firm* — The Webb Law Firm

(57) ABSTRACT

Provided is an electric power control device that allows a work vehicle to travel while carrying out a utility work smoothly. An electric power control device includes an operational state information acquisition section for acquiring operational state information indicative of an operational state of a work vehicle, a battery information acquisition section for acquiring battery information indicative of a state of a battery which is mounted on the work vehicle, a storage section for storing in advance operational mode information, a travel unit that causes the work vehicle to travel, a distributed electric power calculation section for calculating distributed electric powers to be distributed to the travel unit and an implement unit that effects the utility work respectively, and an instruction section for instructing the distributed electric powers to a travel control section that controls the travel unit and an implement control section that controls the implement unit, respectively.

3 Claims, 4 Drawing Sheets

(56) References Cited

U.S. PATENT DOCUMENTS

| | | | |
|---|---|---|---|
| 8,364,333 B2 | 1/2013 | Yanagisawa | |
| 9,226,444 B2 | 1/2016 | Schygge et al. | |
| 2005/0072132 A1* | 4/2005 | Dettmann | A01D 69/02 56/10.8 |
| 2009/0189570 A1* | 7/2009 | Abe | H02J 7/007194 320/162 |
| 2011/0069050 A1* | 3/2011 | Sirmon | H05K 1/142 345/207 |
| 2018/0079404 A1* | 3/2018 | Kaneko | B60L 50/60 |
| 2018/0152121 A1* | 5/2018 | Fukano | A01D 34/006 |

FOREIGN PATENT DOCUMENTS

| | | |
|---|---|---|
| EP | 3326444 A1 | 5/2018 |
| JP | 2008298016 A | 12/2008 |
| JP | 2010248870 A | 11/2010 |
| JP | 201139492 A | 2/2011 |

\* cited by examiner

ELECTRIC POWER CONTROL DEVICE

CROSS-REFERENCE TO RELATED APPLICATION

This application claims priority to Japanese Patent Application No. 2018-116420 filed Jun. 19, 2018, the disclosures of which is hereby incorporated by reference in its entirety.

TECHNICAL FIELD

This invention relates to an electric power control device for controlling electric power consumption of a work vehicle which travels while carrying out a utility work.

BACKGROUND ART

Conventionally, there has been used a work vehicle which travels while carrying out a utility work. As an example of this type of work vehicle, there is known a work vehicle that mounts a battery and uses electric power outputted from the battery as an electric power source for traveling and carrying out a work (e.g. Patent Document 1).

A riding lawnmower disclosed in Patent Document 1 uses an output of a battery as an electric power source and includes a wheel motor for rotating wheels, a blade motor for rotating a mower blade, and a current sensor for detecting currents supplied to the wheel motor and the blade motor. A drive control device controls rotational speeds of the wheel motor and the blade motor, based on result of detection by the current sensor.

BACKGROUND ART DOCUMENT

[Patent Document 1] U.S. Pat. No. 9,226,444

SUMMARY OF THE INVENTION

Problem to be Solved by Invention

The current sensor provided in the riding lawnmower disclosed in Patent Document 1 detects a sum of currents flowing in the wheel motor and the blade motor and controls rotational speeds of the wheel motor and the blade motor, based on this sum of currents. However, with a battery, an amount of electric power that can be outputted therefrom varies in accordance with an environment temperature, stored electric power amount, and degree of deterioration. So, with the rotational speed control technique as disclosed in Patent Document 1 by way of output current alone, there can occur electric power shortage or heat generation, which can make smooth traveling accompanied by working of the riding lawnmower impossible.

Then, there is a need for an electric power control device that allows a work vehicle to travel while carrying out a utility work smoothly.

Solution

According to a characterizing feature of an electric power control device relating to one embodiment of the present invention, an electric power control device for controlling electric power consumption of a work vehicle that travels while carrying out a utility work, comprises:

an operational state information acquisition section for acquiring operational state information indicative of an operational state of the work vehicle;

a battery information acquisition section for acquiring battery information indicative of a state of a battery which is mounted on the work vehicle;

a storage section for storing in advance operational mode information specifying possible operational modes of the work vehicle;

a travel unit that causes the work vehicle to travel based on the operational state information, the battery information and the operational mode information;

a distributed electric power calculation section for calculating distributed electric powers of electric power outputted from the battery to be distributed respectively to the travel unit that causes the work vehicle to travel and an implement unit that effects the utility work; and an instruction section for instructing the distributed electric powers to a travel control section that controls the travel unit and an implement control section that controls the implement unit, respectively.

With the above-described characterizing feature, a latest permissible distribution amount can be calculated from the present operational state of the work vehicle and the present state of the battery and such calculated amount can be instructed to the control units that control the respective functional sections. Therefore, by limiting a motor speed and a motor torque dynamically, overload to the battery can be avoided and deterioration or power shortage of the battery can be prevented.

Preferably, the distributed electric power calculation section can calculate the distributed electric powers with using at least one of a map which shows relationship between energy outputtable from the battery and system electric power consumption of the work vehicle and a map that shows relationship between an operational state of the implement unit and a charged state of the battery.

With the above-described arrangement, the distributed electric powers can be calculated more accurately.

Preferably, the operational state information comprises travel unit information indicative of an operational state of the travel unit and implement unit information indicative of an operational state of the implement unit.

With the above-described arrangement, it becomes possible for the electric power control device to control operations of the travel unit and the implement unit according to operational states of the travel unit and the implement unit. Therefore, it is possible to avoid e.g. a situation of traveling of the work vehicle becoming impossible due to electric power shortage.

Preferably, the operational state information further comprises display information indicative of a display state of an instrument panel of the work vehicle; the distributed electric power calculation section calculates also a distributed electric power to be distributed to the instrument panel; and the instruction section instructs the distributed electric power also to a display control unit which controls display state of the instrument panel.

With the above-described arrangement, when the amount of electric power stored in the battery becomes small, by limiting the display of the instrument panel for instance, electric power can be made available for traveling of the work vehicle. Therefore, it is possible to avoid e.g. a situation of traveling of the work vehicle becoming impossible due to electric power shortage.

DETAILED DESCRIPTION

An electric power control device according to the present invention is configured to be able to appropriately distribute electric power outputted from a battery. Next, an electric power control device 9 (see FIG. 2) according to this embodiment will be explained.

Figure 1:
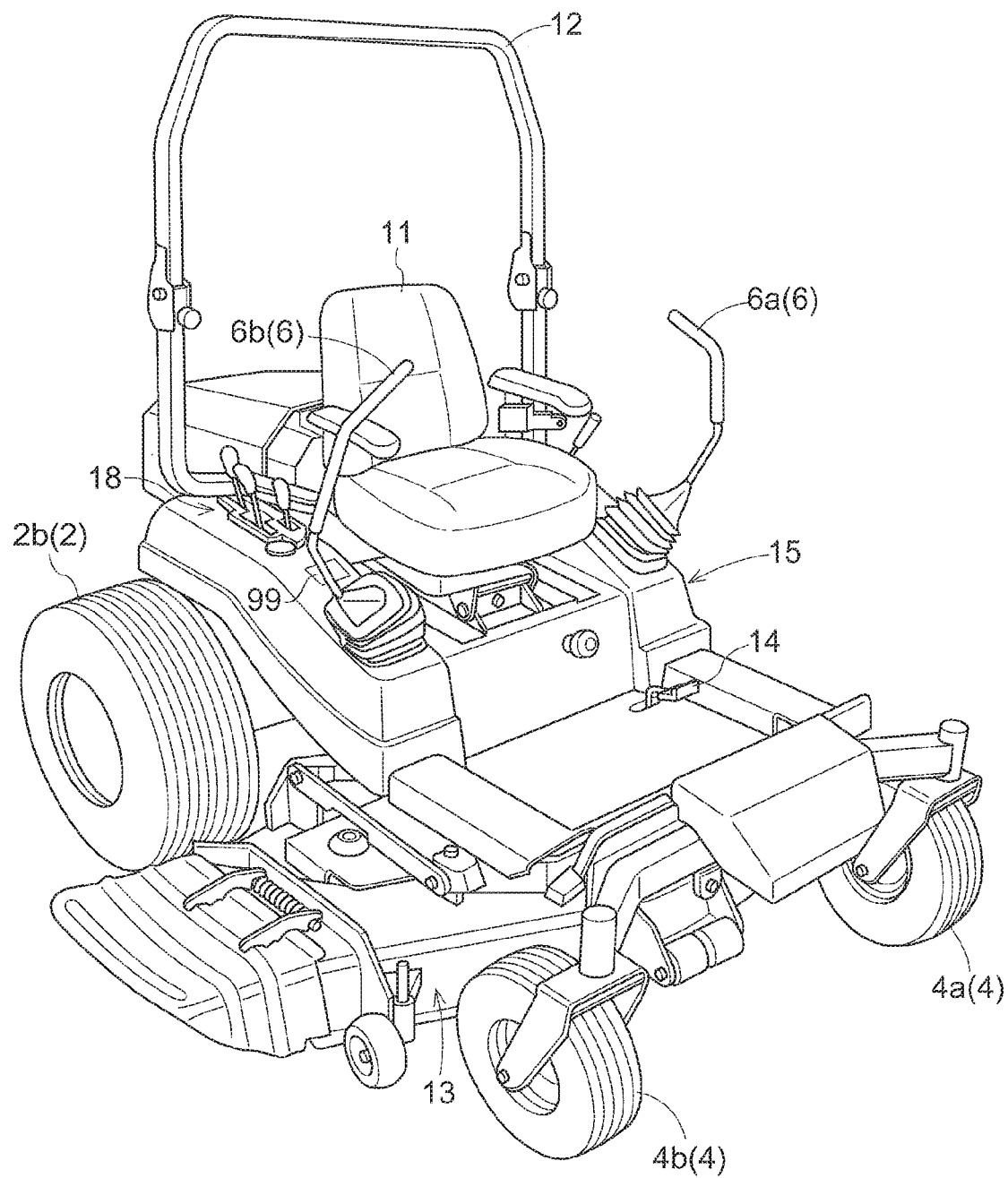
FIG. 1 is a perspective view of a work vehicle mounting an electric power control device.
Figure 2:
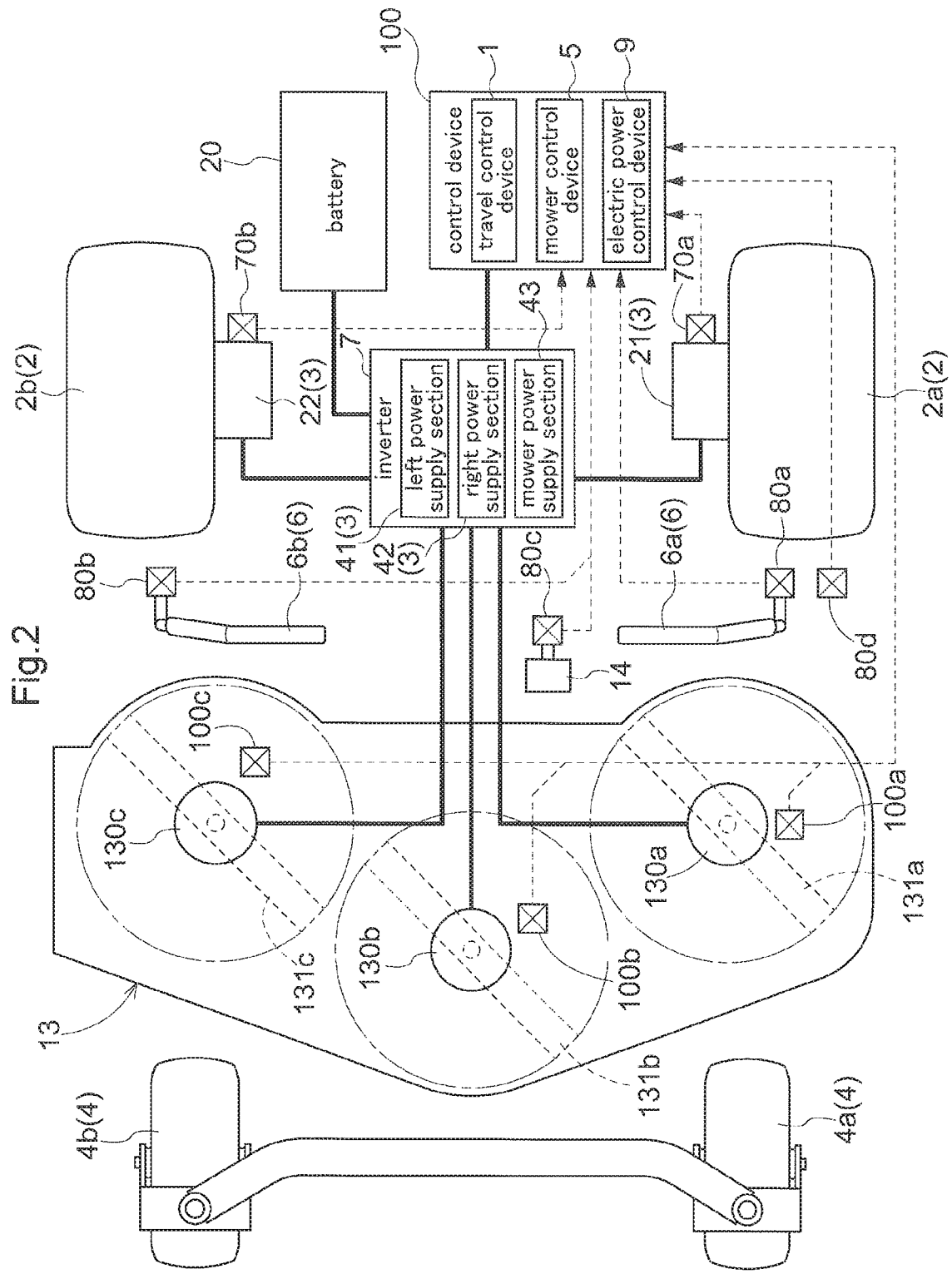
FIG. 2 is a system diagram showing an electric system and a power system of the work vehicle.

FIG. 1 shows a perspective view of a riding electric lawnmower as one example of a traveling vehicle mounting the electric power control device 9 (see FIG. 2) according to this embodiment. Further, FIG. 2 shows an electric system diagram and a power system diagram. The electric power control device 9 of this embodiment controls electric power consumption of a work vehicle that travels while carrying out a utility work. This embodiment will be explained with citing a riding electric work vehicle as an example of the work vehicle. In this case, the utility work to be carried out is a lawn mowing work. Electric power consumption of the work vehicle includes electric power consumed for traveling of the work vehicle, electric power consumed for the utility work carried out by the work vehicle and electric power consumed for a user of the work vehicle. Specifically, the electric power consumed for traveling of the work vehicle is provided by the electric power supplied to the motors for operating drive wheels 2 of the work vehicle. The electric power consumed for the work to be carried out by the work vehicle is provided by the electric power supplied to motors which rotate mower blades. And, the electric power consumed for the user of the work vehicle is provided by the electric power consumed for displaying of the instrument panel 99. The electric power control device 9 is mounted on a work vehicle that carries out such utility work and distributes appropriately respective electric powers to the functional sections which respectively effect the functions.

As shown in FIG. 1 and FIG. 2, the riding electric lawnmower includes a vehicle body 15 supported by caster wheels 4 as front wheels and drive wheels 2 as rear wheels, a battery 20 disposed at a rear portion of the vehicle body 15, a driver's seat 11 disposed forwardly of the battery 20, a ROPS frame 12 mounted vertically rearwardly from the driver's seat 11, and a mower unit 13 suspended from the vehicle body 15 to be liftable up/down via a lift link mechanism at a space under the vehicle body 15 between the caster wheels 4 and the drive wheels 2.

The drive wheels 2 are driven by a travel control unit 3 whose operation is controlled by a travel control device 1 and the mower unit 13 has its operation controlled by a mower control device 5. Here, the caster wheels 4 consist of a left caster wheel 4a and a right caster wheel 4b. The drive wheels 2 consist of a left drive wheel 2a and a right drive wheel 2b.

Forwardly of the driver's seat 11, there is provided a floor plate as a "footrest" for the driver, from which a brake pedal 14 protrudes. On the opposed sides of the driver's seat 11, a left maneuvering lever 6a and a right maneuvering lever 6b are disposed. Further, on the lateral side of the driver's seat 11, there is provided an electric operational panel 18 including switch buttons, switch levers, etc. of the electric system.

On the electric operational panel 18, there are also disposed a mower switch for activating the mower unit 13 and the above-described instrument panel 99. Incidentally, the left maneuvering lever 6a and the right maneuvering lever 6b will be collectively referred to as "maneuvering levers 6" hereinafter, unless distinction therebetween is particularly needed.

In the instant embodiment, the left drive wheel 2a and the right drive wheel 2b use rotational electric powers from a left motor 21 and a right motor 22, respectively as electric power source thereof. The left motor 21 receives electric power via a left electric power supply section 41 constituting an inverter 7 and the right motor 22 receives electric power via a right electric power supply section 42 also constituting the inverter 7. By varying the respectively supplied electric powers, it is possible to change at least one of a rotational speed and a torque. Rotational speeds (circumferential speeds) of the left drive wheel 2a and the right drive wheel 2b can be made different from each other. And, with a rotational speed difference between the left drive wheel 2a and the right drive wheel 2b, a turning of the riding lawnmower is effected.

The travel control unit 3 is a functional section for controlling traveling and turning of the riding electric lawnmower and in the instant embodiment, this unit 3 is constituted of the left motor 21, the right motor 22 and the inverter 7 (in particular, the left electric power supply section 41 and the right electric power supply section 42). The inverter 7 supplies electric power to the left motor 21 and the right motor 22, respectively. The electric power outputted from the inverter 7 corresponds to a speed instruction value (a target value) calculated by the travel control device 1. But, depending on the traveling load, if the actual rotational speed (the actual speed) becomes smaller than the target value, the electric power will be corrected to increase the motor output torque. On the other hand, if the actual rotational speed (the actual speed) becomes greater than the target value, the electric power will be corrected to decrease the motor output torque.

The mower unit 13 includes three rotary blades 131a, 131b, 131c corresponding to mower blades. The rotary blades 131a, 131b, 131c respectively rely on mower motors 130a, 130b, 130c as the drive source thereof. The mower motors 130a, 130b, 130c receive electric powers via a mower electric power supply section 43 which also constitutes the inverter 7. The mower electric power supply section 43 is controlled by the mower control device 5. This mower control device 5 constitutes a control device 100, together with the travel control device 1 and the electric power control device 9.

An operational amount (a pivot angle) of the left maneuvering lever 6a is detected by a left maneuvering angle detection sensor 80a. An operational amount (a pivot angle) of the right maneuvering lever 6b is detected by a right maneuvering angle detection sensor 80b. Further, an operational angle of the brake pedal 14 is detected by a brake detection sensor 80c. An operation of the mower switch is detected by a mower sensor 80d. Further, a rotational speed of the left drive wheel 2a is detected by a left rear wheel rotation detection sensor 70a and a rotational speed of the right drive wheel 2b is detected by a right rear wheel rotation detection sensor 70b. Rotational speeds of the mower motors 130a, 130b, 130c are detected by rotation sensors 100a, 100b, 100c. Results of detections by the respective sensors are transmitted to the control device 100 to be used by this control device 100 when needed.

The travel control device 1 calculates target rotational speeds for the left drive wheel 2a and the right drive wheel 2b, based on operational amounts of the maneuvering levers 6 detected by the left maneuvering angle detection sensor 80a and the right maneuvering angle detection sensor 80b. Further, from the respective target rotational speeds, electric power amounts to be supplied respectively to the left motor 21 and the right motor 22 are calculated. Then, the travel control device 1 drives the left motor 21 and the right motor 22 in accordance with these electric power amounts. Here, depending on a traveling condition, it may happen that the actual rotational speeds of the drive wheels 2 do not agree with the target rotational speeds controlled based on the operational amounts of the maneuvering levers 6. In such case, the travel control device 1, by using the known feedback control technique, will correct the above-described electric power amounts so as to bring the actual rotational speeds of the drive wheels 2 into agreement with the target rotational speeds based on the operational amounts of the maneuvering levers 6. In the course of this, the travel control device 1 calculate required drive torques (to be referred to shortly as "required torques" hereinafter) required of the left motor 21 and the right motor 22. The "required torque" means an amount of torque required of the left motor 21 or the right motor 22 in order to bring the actual rotational speed into agreement with the target rotational speed, in case the actual rotational speed fails to reach the target rotational speed. Thus, the travel control device 1 will derive such required torques, from the target rotational speeds for the left drive wheel 2a and the right drive wheel 2b based on the detection results of the left maneuvering angle detection sensor 80a and the right maneuvering angle detection sensor 80b and the actual rotational speeds of the left drive wheel 2a and the right drive wheel 2b obtained by the left rear wheel rotation detection sensor 70a and the right rear wheel rotation detection sensor 70b. Then, the travel control device 1 corrects the electric power amounts, based on the calculated required torques.

Figure 3:
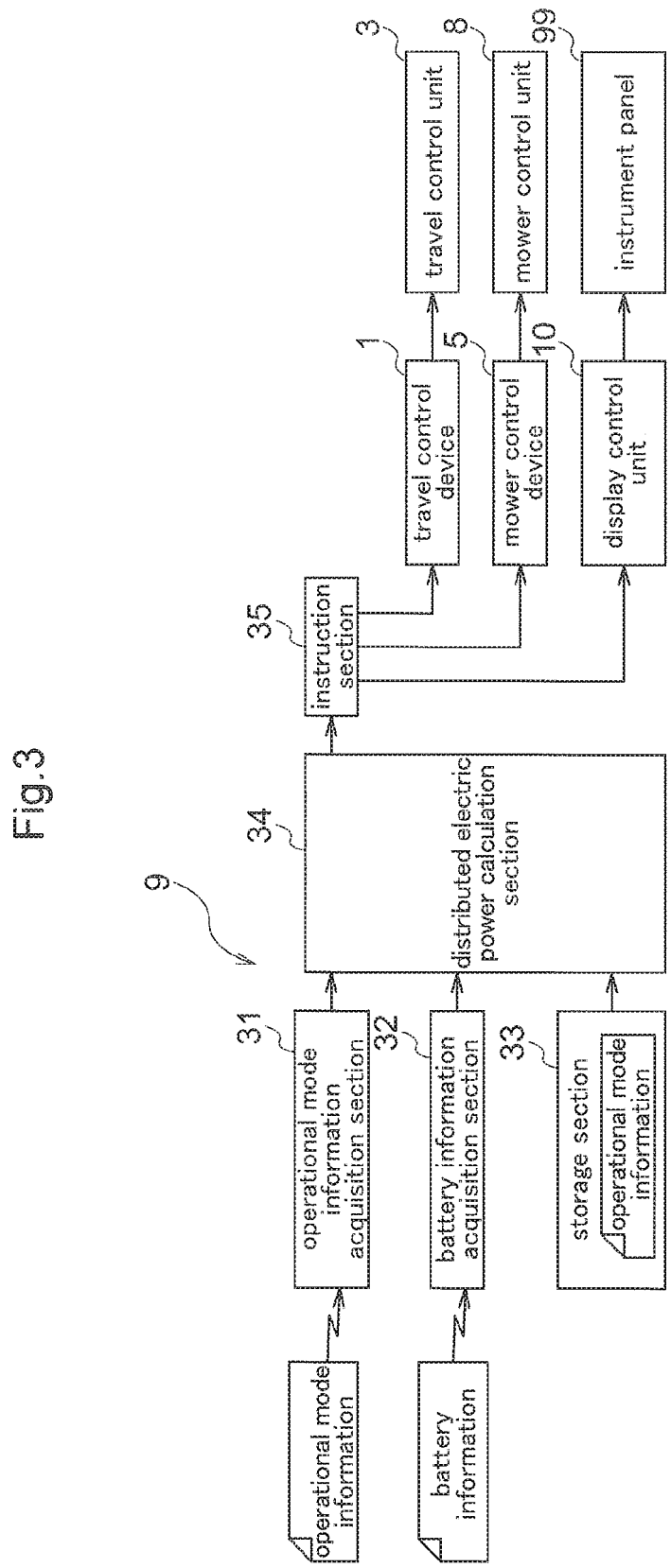
FIG. 3 is a block diagram showing a configuration of the electric power control device.

FIG. 3 is a block diagram showing a configuration of the electric power control device 9 according to the instant embodiment. As shown in FIG. 3, the electric power control device 9 is comprised of functional sections including an operational state information acquisition section 31, a battery information acquisition section 32, a storage section 33, a distributed electric power calculation section 34 and an instruction section 35. The respective functional sections are constituted of hardware and/or software, including a CPU as a core component thereof.

The operational state information acquisition section 31 acquires operational state information indicative of an operational state of the work vehicle. In the instant embodiment, the work vehicle is the riding electric lawnmower. The operational state of the work vehicle refers to an operational state of the respective functional section of the riding electric lawnmower and the operational state information refers to information indicative of an operational state of such respective functional section.

In the instant embodiment, the operational state information corresponds to travel unit information indicative of an operational state of the travel control unit 3 (an example of "travel unit") and implement unit information indicative of an operational state of the mower control unit 8 (an example of "implement unit"). The travel control unit 3, as described hereinbefore, corresponds to the left motor 21 and the right motor 22 as well as the left electric power supply section 41 and the right electric power supply section 42 shown in FIG. 2. Further, the mower control unit 8 corresponds to the mower motors 130a, 130b, 130c and the mower electric power supply section 43, shown in FIG. 2. The operational state information includes such travel unit information and implement unit information.

Further, advantageously, the operational state information includes also display information indicative of display state of the instrument panel 99 of the riding electric lawnmower. On the instrument panel 99, information such as a traveling speed of the riding electric lawnmower, rotational speeds of the mower blades, etc. will be displayed. This instrument panel 99 allows adjustments of its brightness and luminance and information indicative of such brightness and luminance corresponds to the display information.

More particularly, the above-described operational state information corresponds to e.g. a traveling output of the riding electric lawnmower (outputs respectively of the left motor 21 and the right motor 22 shown in FIG. 2), information indicative of implement output (e.g. the respective output values of the motor motors 130a, 130b, 130c shown in FIG. 2), information indicative of accessory output (e.g. the display information of the instrument panel 99), information indicative of motor temperatures (e.g. the respective temperatures of the left motor 21, the right motor 22, the mower motors 130a, 130b, 130c, shown in FIG. 2), information indicative of inverter temperatures (the respective temperatures of the left electric power supply section 41, the right electric power supply section 42, and the mower electric power supply section 43 together constituting the inverter 7, as shown in FIG. 2).

The operational state information acquisition section 31 acquires such operational state information from the respective functional sections. Incidentally, these information can be acquired alternatively from detection results of further sensors which can be provided separately from, i.e. in addition to, the sensors described above. The operational state information acquired by the operational state information acquisition section 31 will be transmitted to the distributed electric power calculation section 34 to be described later.

The battery information acquisition section 32 acquires battery information indicative of a state of the battery 20 (see FIG. 2 hereinafter) mounted on the work vehicle. The battery information corresponds to e.g. a temperature, a charged state (SOC: State of Charge), a permissible charge amount, a permissible discharge amount, a permissible regeneration amount, etc. of the battery 20. Advantageously, a sensor will be provided in the battery 20 and such battery information can be acquired from its detection result. The battery information acquired by the battery information acquisition section 32 will be transmitted to the distributed electric power calculation section 34 to be described later.

The storage section 33 stores therein in advance operational mode information specifying possible operational modes of the work vehicle. Here, "possible operational modes of the work vehicle" means operational modes assumed to be taken by the riding electric lawnmower in its traveling, including specifically and at least a state of traveling without involving any lawn mowing work by the riding electric lawnmower and a state of traveling involving lawn mowing work. The storage section 33 stores such operational mode information of such operational states in advance. The storage section 33 may store other operational mode information other than the operational mode information of such assumed operational states.

The distributed electric power calculation section 34 calculates distributed electric power of the electric power outputted from the battery 20 to be distributed respectively to the travel unit that causes the work vehicle to travel and the implement unit that carries out a utility work, based on the operational state information, the battery information and the operational mode information. The operational state information is transmitted from the operational state information acquisition section 31. The battery information is transmitted from the battery information acquisition section 32. The operational mode information is stored in the storage section 33 and referred to therein. The travel unit that causes the work vehicle to travel refers to the travel control unit 3. The implement unit that carries out a work refers to the mower control unit 8 for carrying out a lawn mowing work.

The distributed electric power calculation section 34 distributes electric powers according to the order of priorities given to the respective operational modes. The distribution of the electric power can be effected with using a plurality of maps or can be effected with using a calculation formula also. Further alternatively, it is possible to determine the respective information constituting the above-described operational state information and battery information based on a predetermined condition and to change the distributed electric power based solely on the result of such determination.

Figure 4:
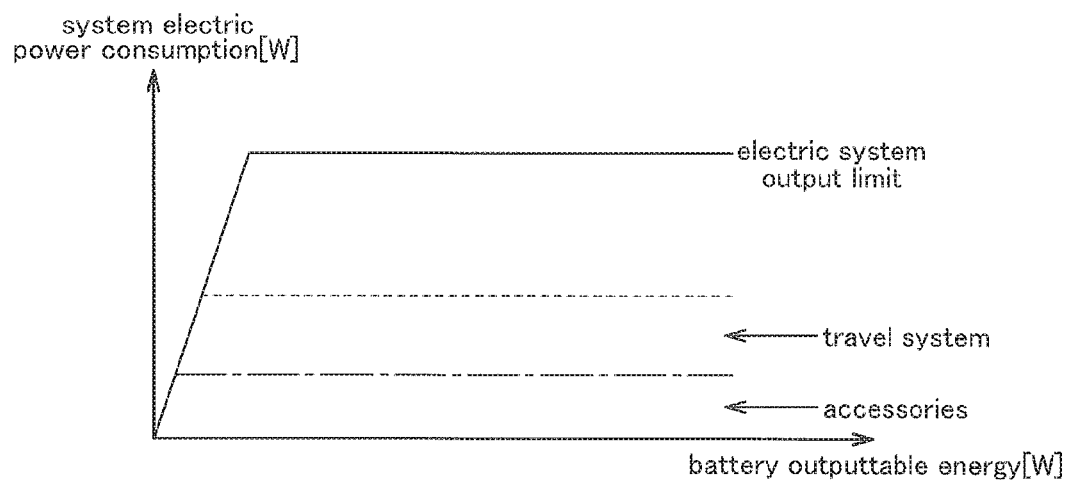
FIG. 4 is a view showing one example of operational mode information.
Figure 5:
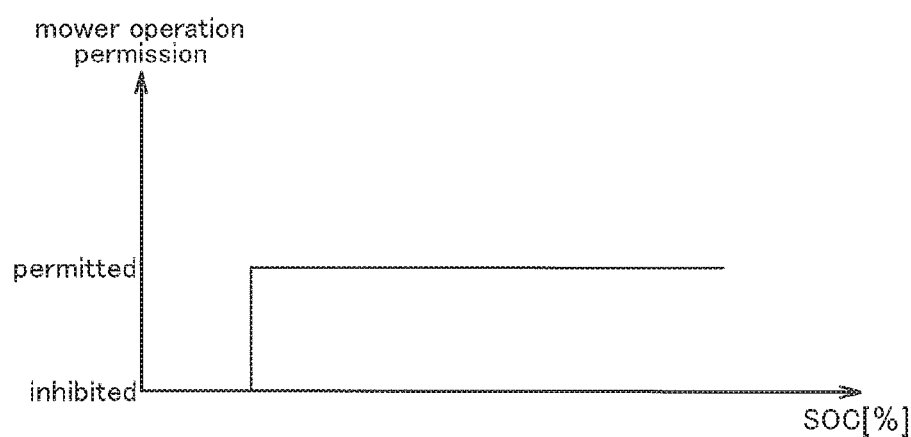
FIG. 5 is a view showing one example of operational mode information.

FIG. 4 and FIG. 5 show an example of the map used by the distributed electric power calculation section 34. FIG. 4 is a view showing relationship between battery outputtable energy and system electric power consumption. FIG. 5 is a view showing relationship between mower operation (lawn mowing operation) and SOC. The distributed electric power calculation section 34 calculates a distributed electric power with using a map such as the one shown in FIG. 4 or FIG. 5 and then transmits the calculated distributed electric power to the instruction section 35. Such distributed electric power calculation section 34 functions as an electric power management controller. Meanwhile, at this time, the distributed electric power calculation section 34 may advantageously calculate also a distributed electric power to be distributed to the instrument panel 99.

As shown in FIG. 3, the instruction section 35 instructs distributed electric powers to the travel control section which controls the travel unit and the implement control section which controls the implement unit, respectively. Such distributed electric powers are calculated by the distributed electric power calculation section 34 and transmitted therefrom. The travel unit control section for controlling the travel unit corresponds to the travel control device 1 that controls the travel control unit 3. The implement unit control section that controls the implement unit corresponds to the mower control device 5 that controls the mower control unit 8. Thus, the instruction section 35 instructs the distributed electric powers calculated by the distributed electric power calculation section 34 to the travel control device 1 that controls the travel control unit 3 and to the mower control device 5 that controls the mower control unit 8, respectively.

Further, in the instant embodiment, as described above, the distributed electric power calculation section 34 calculates also a distributed electric power to be distributed to the instrument panel 99. Thus, the instruction section 35 instructs a distributed electric power also to the display control unit 10 that controls display of the instrument panel 99. The display control unit 10 means the functional section which adjusts brightness and luminance of the instrument panel 99.

More particularly, the instruction section 35 provides motor drive instructions and output limiting instructions (e.g. electric power running/regeneration energy or state flag) to the left electric power supply section 41 (see FIG. 2) and the right electric power supply section 42 (see FIG. 2) used for traveling of the riding electric lawnmower, of the inverter 7 (see FIG. 2 for these all). With this, limiting of the rotational speeds or torques (currents) of the left motor 21 (see FIG. 2) and the right motor 22 (see FIG. 2) will be effected.

Further, the instruction section 35 provides motor drive instructions and output limiting instructions to the mower electric power supply section 43 (see FIG. 2) used in the work by the riding electric lawnmower. With this, the mower motors 130*a*, 130*b*, 130*c* (see FIG. 2 for these all) will be controlled.

Moreover, the instruction section 35 provides an operational instruction (an accessory operation instruction) to the display control unit 10 that controls the instrument panel 99. With this, the instrument panel 99 will be controlled.

With the above-described arrangements, it becomes possible to limit the rotational speeds or the torques of the respective motors with use of a map, in accordance with an amount of electric power stored in the battery 20. Therefore, it is possible to prevent the situation of traveling of the riding electric lawnmower being disabled due to electric power shortage. Incidentally, the electric power control device 9 can be configured to change the instructions stepwise to the respective functional sections described above.

Further Embodiments

In the foregoing embodiment, there was explained as an example the case in which the maneuvering levers 6 are mounted on the vehicle body 15 of the riding electric lawnmower. However, the riding electric lawnmower can be configured to be capable of remote control via a remote controller.

In the foregoing embodiment, it was explained that the operational state information refers to the travel unit information and the implement unit information. However, the operational state information can be one of the travel unit information and the implement unit information or can be any information other than the travel unit information and the implement unit information.

In the foregoing embodiment, it was explained that the operational state information includes the display information indicative of the display state of the instrument panel 99. However, the operational state information can be configured not to include the display information indicative of the display state of the instrument panel 99. Further alternatively, the operational state information can be configured to include information other than the display information indicative of the display state of the instrument panel 99 (e.g. operational information of an air conditioner, operational information of an audio device, need for alarm for various instruments, etc.)

In the foregoing embodiment, the riding electric lawnmower was cited as an example of the work vehicle on which the electric power control device 9 is to be mounted. However, the work vehicle can be any other vehicle.

INDUSTRIAL APPLICABILITY

The present invention is applicable to an electric power control device that controls electric power consumption of a work vehicle which travels while carrying out a utility work.

DESCRIPTION OF SIGNS

1: travel control device (travel unit control section)
3: travel control unit (travel unit)

5: mower control device (implement unit control section)
8: mower control unit (implement unit)
9: electric power control device
10: display control unit
20: battery
31: operational state information acquisition section
32: battery information acquisition section
33: storage section
34: distributed electric power calculation section
35: instruction section

The invention claimed is:

1. An electric power control device for controlling electric power consumption of a work vehicle that travels while carrying out a utility work, the control device comprising:
   a first sensor for acquiring an output value of a drive motor as one type of operational state information indicative of an operational state of the drive motor, the drive motor driving a drive wheel for causing the work vehicle to travel;
   a second sensor for acquiring an output value of a mower motor as another type of the operational state information indicative of an operational state of the mower motor, the mower motor driving a mower unit for carrying out the utility work;
   a third sensor for acquiring battery information indicative of a state of a battery which is mounted on the work vehicle, the state of the battery including at least a charged state of the battery and a permissible discharge amount of the battery corresponding to an upper limit less than a maximum possible discharge amount of the battery;
   a memory for storing in advance operational mode information specifying possible operational modes of the work vehicle, including at least a state in which the work vehicle travels without carrying out the utility work, and a state in which the work vehicle travels with carrying out the utility work; and
   a controller for changing distributed electric powers of electric power outputted from the battery to be distributed respectively to the drive wheel and the mower unit based on the operational state information regarding the utility work and the traveling, the battery information, and the operational mode information, so that the permissible discharge amount is allocated to the drive wheel and the mower unit at an appropriate ratio, and for instructing the distributed electric powers to the drive motor that controls the drive wheel and the mower motor that controls the mower unit, respectively.

2. The electric power control device of claim 1, wherein the controller changes the distributed electric powers with using at least one of a map which shows relationship between energy outputtable from the battery and system electric power consumption of the work vehicle and a map that shows relationship between the operational state of the mower unit and the charged state of the battery, in view of the upper limit of the electric power suppliable to the drive wheel and the mower unit.

3. The electric power control device of claim 1, wherein:
   the operational state information further comprises display information indicative of a display state of an instrument panel of the work vehicle; and
   the controller changes also the distributed electric power to be distributed to the instrument panel and instructs the distributed electric power also to a display control unit which controls display state of the instrument panel.

* * * * *